Patented Feb. 19, 1952

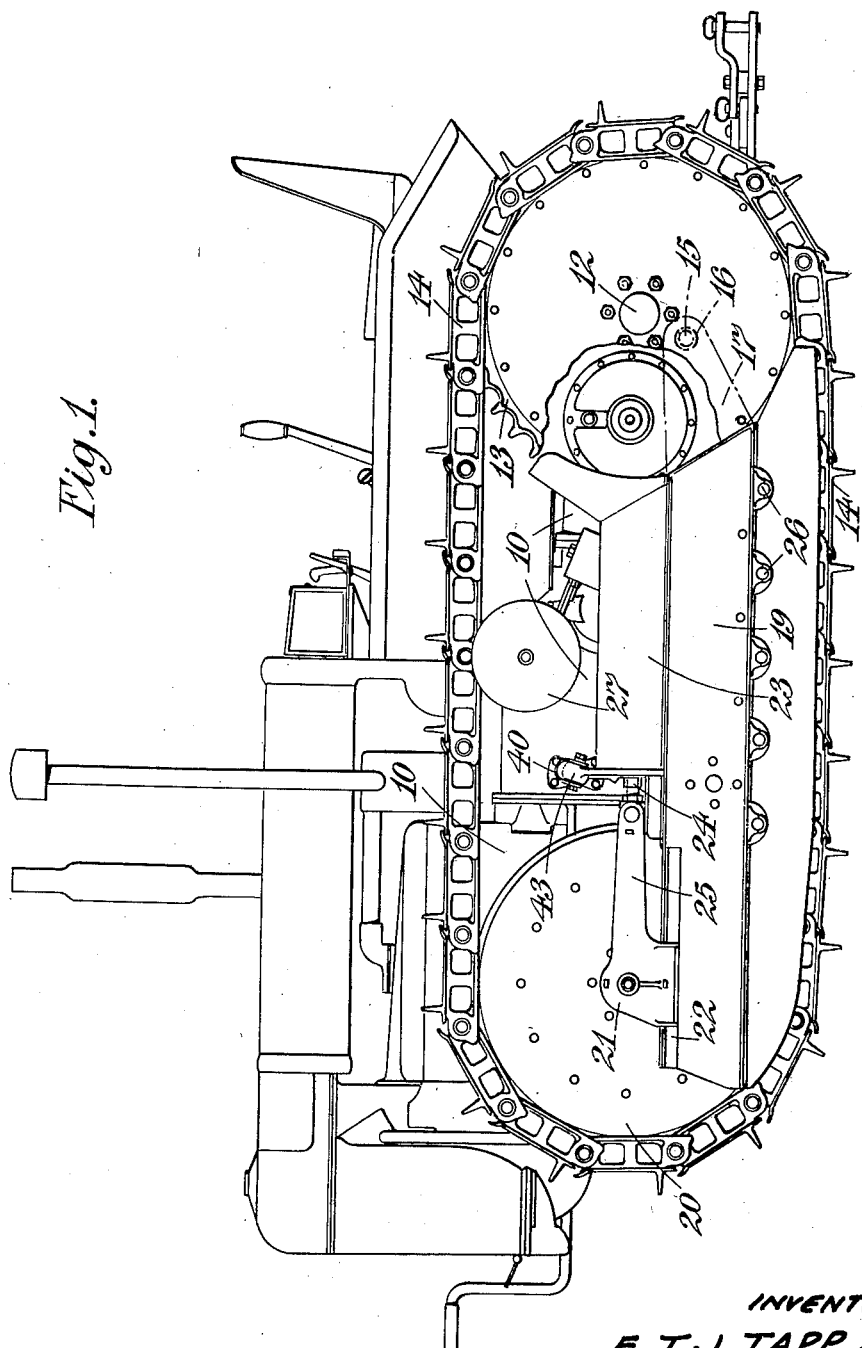

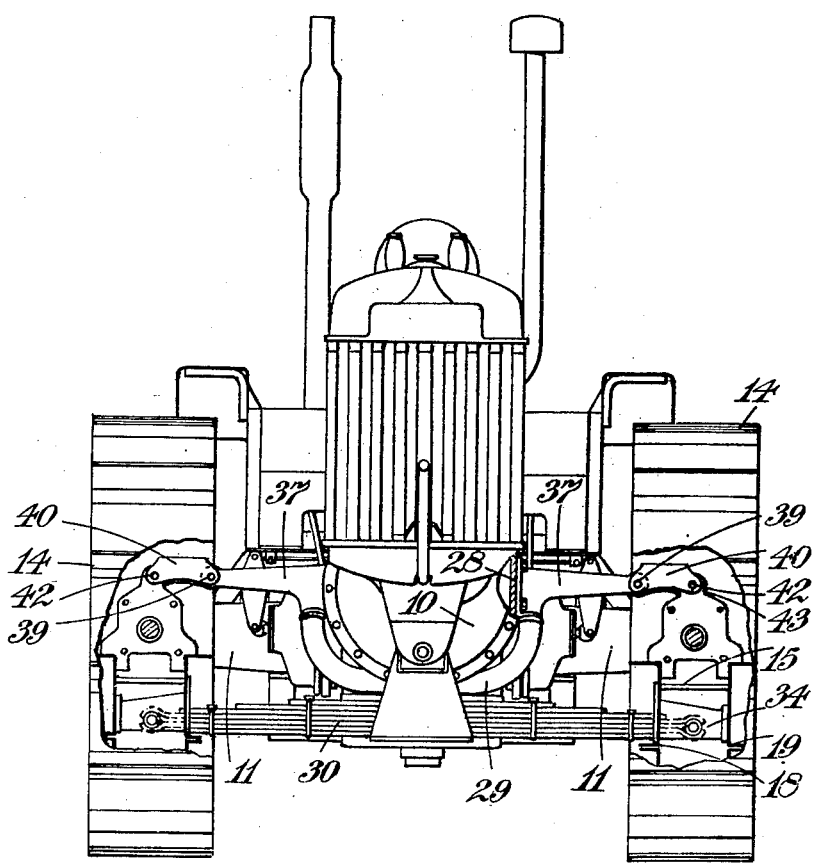

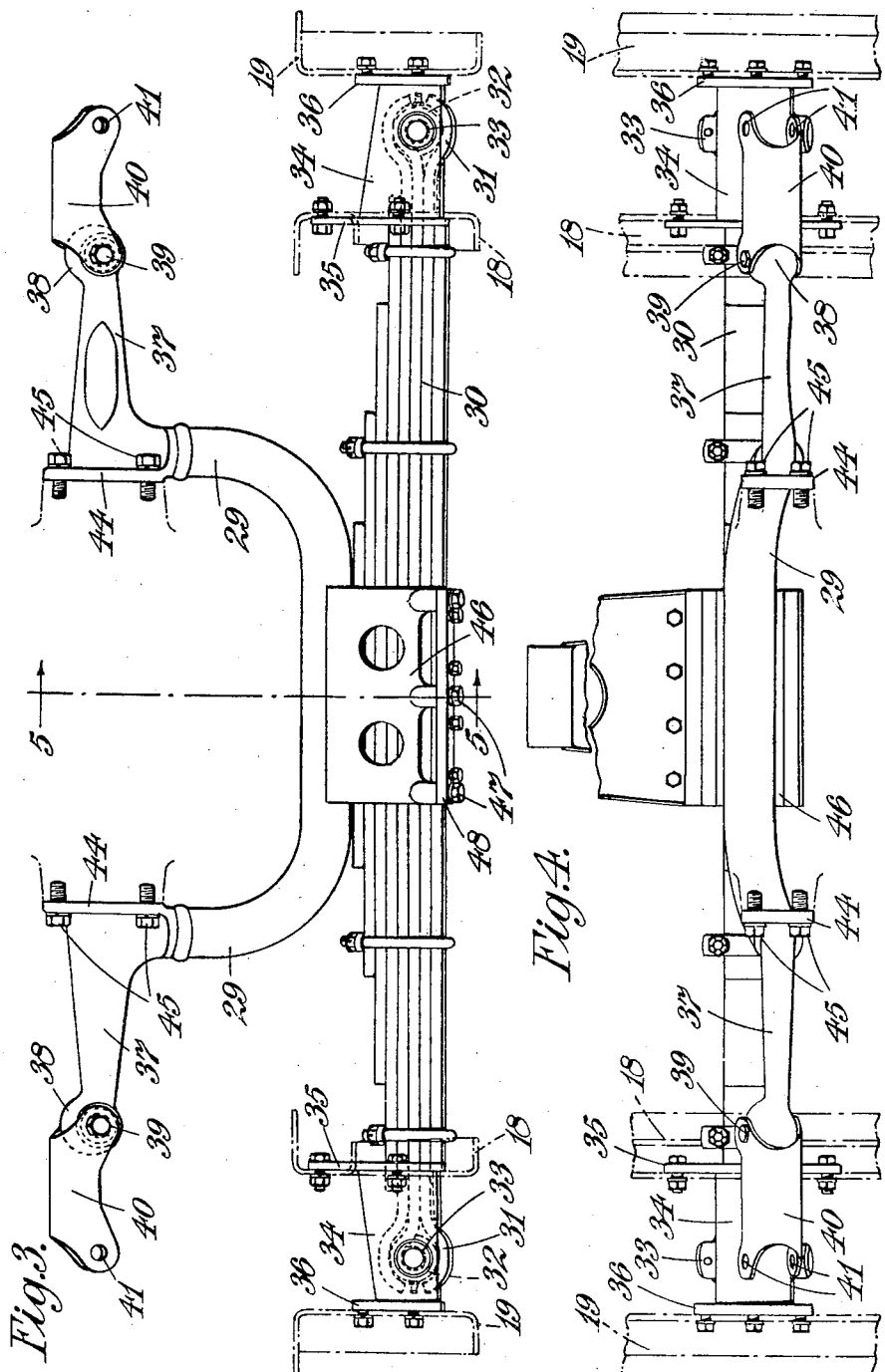

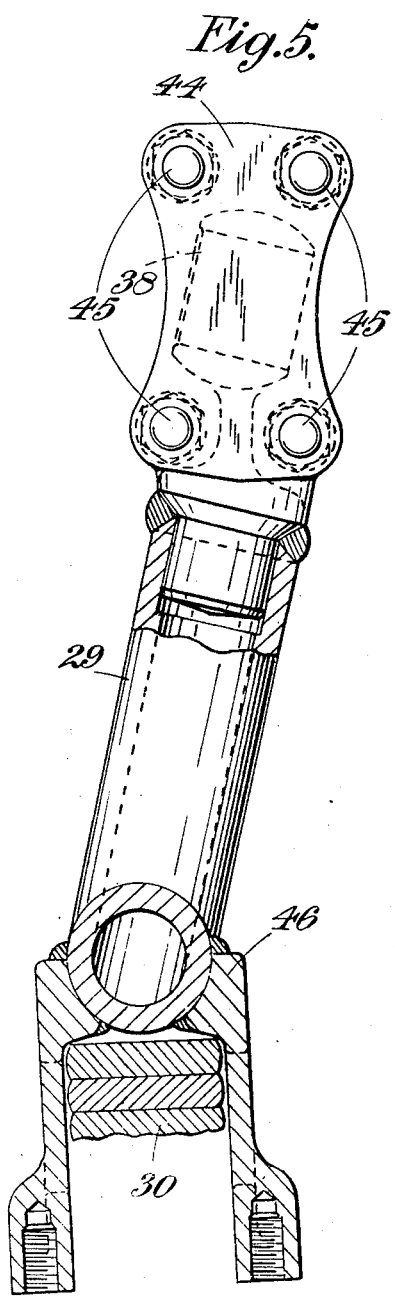

2,586,742

UNITED STATES PATENT OFFICE 2,586,742

MEANS FOR ATTACHING ON EACH SIDE OF A VEHICLE CHASSIS OR BODY A FRAME CARRYING AN ENDLESS DRIVING TRACK

Ernest Thomas James Tapp and Joseph Davey, Fleet, England, assignors to County Commercial Cars Limited, Fleet, Aldershot, England Application October 13, 1949, Serial No. 121,164
In Great Britain October 15, 1948

6 Claims. (Cl. 305—9)

This invention relates to means for attaching on each side of a vehicle a frame carrying an endless driving track driven by a sprocket rotatably mounted on the vehicle body and has for one of its objects to provide an arrangement suitable for replacing the driving wheels of a vehicle by endless driving tracks, but it will be appreciated that the invention is also applicable to a vehicle which is designed in the first instance as an endless track vehicle. Each endless driving track is of the kind which encircles a sprocket wheel and a pulley or idler wheel, or the like, spaced apart fore and aft of the vehicle, which sprocket is driven by a shaft from the vehicle's engine, and the lower stretch of which track engages the ground and is backed intermediate of the said sprocket and pulley by idler wheels mounted on said frame.

According to this invention, means for attaching to a vehicle a frame carrying an endless track of the kind referred to, which attaching means comprise a pivotal connection between the track frame and a part of the vehicle chassis or body, the pivot axis of which connection is arranged co-axially or close and parallel to the axis of the driving shaft, a transversely extending spring attached between said frame and the vehicle at a point spaced in a fore-and-aft direction away from said driving shaft, and means which constrain a point of said track to move in an up-and-down direction.

The said constraining means may comprise an arm or link pivotally attached at one end to the track frame at a point disposed away from a line joining the other two points of attachment and so connected to the vehicle chassis or body as to permit up and down movement of its pivotal connection with the track frame.

For example, said arm or link may be pivotally attached at its ends to said track frame and vehicle body or chassis respectively to swing at least about axes extending in a fore-and-aft direction.

In the case where the invention is applied to a tractor in which the engine and gear casing comprises a single unit and form part of the chassis frame, each said arm or link may be pivotally attached at one end to said track frame, and at the other to the adjacent side of the engine or gear casing.

Preferably, the axes of the pivotal connections between said arm or link and the track frame and between the spring and the track frame are both arranged to pass through the centre or axis of the first said pivotal connection between the frame and the part of the chassis near the driving shaft and thus as the track frame swings in an up-and-down direction about the axis of the last said pivotal connection, the arm and spring swing in unison about the axes of the other two pivotal connections respectively.

The length of distance between the pivot axes of said arm or link and the distance between the point of connection of the spring to the track frame and its anchorage point on the vehicle chassis or body are so selected that during the relative movement between the track frame and vehicle chassis or body in an up-and-down direction the track rocks on its bottom supporting rollers rather than shifts laterally.

The aforesaid spring may comprise a leaf spring attached to and extending transversely across the vehicle.

In applying the invention to a vehicle designed primarily for use with wheels, the first said pivotal mounting for said track frame may be formed on or attached to the axle casing of the vehicle.

The aforesaid arm for each track frame and the transversely extending spring may be anchored to a yoke-piece for attachment to the vehicle, for example, in the case where the vehicle is in the form of a tractor having an engine and gear casing forming a part of the chassis, the yoke-piece may be U-shaped and have the upper extremities of its limbs bolted to the sides of the engine and gear casing and the spring bolted to the bottom of the U.

Preferably, the aforesaid pivotal mountings are provided with resilient bushes.

The pivotal connection between each end of the leaf spring and the frame comprises a pin extending through a bush attached to or formed at the end of the spring, which pin is fixed in a carrying member arranged to be detachably connected with said frame, whereby the detachment of the frame for repair or replacement is facilitated.

The following is a more detailed description of the invention as applied to a power unit primarily designed for use with land wheels, reference being made to the accompanying drawings in which, Figure 1 is a side elevation of the tractor, Figure 2 is a front elevation, Figure 3 is a rear elevation of a yoke-piece for attachment to the engine and to a cross spring, Figure 4 is a plan of the arrangement shown in Figure 3, and, Figure 5 is a part section on the line 5—5 of Figure 3 looking in the direction of the arrow.

The tractor is of a known kind in which the engine and gear casing 10 (see Figures 1 and 2) supports the rest of the parts of the vehicle and to which is attached the axle casing 11 in which the wheel axles 12 project from either side thereof. In adapting this construction, the wheels are omitted and there is attached to each projecting end of the axle a sprocket wheel 13 for driving an endless track 14. There is also attached to the underside of each end of the axle casing a pin 15 which engages a resiliently mounted bush 16 carried by the rear part 17 of the supporting frame for the endless driving track. This frame comprises two channel-shaped members 18, 19 extending fore and aft and spaced apart so that their flanges are directed away from one another. Each endless track 14 passes around a drum or pulley 20 which is mounted in bearings 21 slidable along a guideway 22. The bearings are pressed forwardly against a stop by a spring disposed in a spring box 23 attached to the top of the frame which spring engages a thrust rod 24 secured to a rearwardly extending arm 25 fixed on the bearing.

On the underside of the frame are mounted on spindles 26, a number of idler wheels (not shown) constituting a backing for the endless track. A spring-urged jockey pulley 27 is mounted on the top of the frame so as to engage the upper stretch of the track.

It is usual to provide the engine casing of a tractor on each side thereof with an upright abutment face 28 (see Figure 2), to which frames for carrying cultivating implements may be attached. In the present invention, these flat upright abutment faces are arranged for the attachment of a U-shaped yoke-piece 29 which extends around the underside of the engine and gear casing 10. The bottom of the U-shaped yoke-piece 29 has secured to it a leaf spring 30 which extends laterally on each side thereof and each extremity of the leaf spring has certain of the leaves shaped to form the socket 31 (see Figure 3) in which is located a bush 32 arranged with its axis extending in a direction fore and aft of the vehicle so as to intersect the aforesaid pin 15. Located in each bush is a pivot pin 33 and the ends of the pivot pins are carried in a box-like carrier 34 of inverted channel section which is open at one end and which registers with an opening in the frame member 18 through which opening the end of the leaf spring extends. The box-like carrier is provided with flanges 35, 36 at its end for attachment to two channel frame members 18 and 19.

As will be seen from Figure 3, the upper extremity of each limb of the U-shaped yoke-piece 29 is formed with an outwardly directed arm 37 having an enlarged extremity 38 drilled to receive a pivot bolt 39. The bolt is arranged to extend in a fore-and-aft direction and its axis is inclined to a horizontal plane so as to intersect the aforesaid pin 15. The enlarged end of the arm 37 is embraced by the two limbs of a U-section link 40. The other extremity of the link is drilled at 41 to receive a pivot pin 42 arranged parallel with the pivot bolt 39 which engages a hole in a lug 43. The lug 43 extends upwardly from the forward end of the spring box 23. The root of the arm 37 is provided with a flat vertically extending pad 44 which is clamped by set screws 45 to the aforesaid flat face 28 on the engine casing.

The bottom of the U-shaped yoke-piece 29 is provided with a socket member 46 which is arranged to straddle the spring 30 and the lower extremities of its walls are drilled and tapped to receive set screws 47 by which a clamping plate 48 is secured in position. The angle of inclination of the pivot pins 39 and 42 is such as to intercept the axis of the pin 15. The length of the link 40 and the locus of movement of the pin 33 at the end of the spring is so selected that as the track frame swings up and down about the axis of the pin 15, the track frame rocks about the lower stretch on the track without shifting laterally. The bushes for the various pivot pins are preferably provided with resilient linings.

We claim:

1. A motor driven endless track vehicle comprising a chassis, a track frame on each side of the chassis, a pivotal mounting connecting one end of each track frame to the chassis so that the track frame may swing in an up-and-down direction, a transversely extending spring fixed to said chassis and having its two ends respectively connected to the two track frames at locations disposed away from the pivotal mountings in a longitudinal direction with respect to the length of the vehicle and two links mounted independently of one another on opposite sides of the chassis and each having its opposite ends pivotally connected respectively to the chassis and to a track frame, so as to swing about axes extending in a longitudinal direction with respect to the length of the vehicle, each of which pivotal mountings is resiliently yielding to permit said track frame to rock about its lower ends.

2. A motor driven endless track vehicle comprising a chassis, a track frame on each side of the chassis, a pivotal mounting connecting one end of each track frame to the chassis so that the track frames may swing in an up-and-down direction, a transversely extending spring fixed to said chassis and having its two ends respectively connected to the two track frames at locations disposed away from the pivotal mountings in a longitudinal direction with respect to the length of the vehicle and two links mounted independently of one another on opposite sides of the chassis and each having its opposite ends pivotally connected respectively to the chassis and to a track frame so as to swing about axes extending in a longitudinal direction with respect to the length of the vehicle, each of which pivotal mountings is resiliently yielding to permit said track frame to rock about its lower ends, which pivotal connections of the links and of said spring are arranged with their pivot axes intersecting the axis of said mountings.

3. A motor driven endless track vehicle comprising a chassis, a cross shaft driven by the motor and mounted on the chassis so as to project on either side thereof, a driving sprocket fixed on each projecting end, a track frame on each side of the chassis, a pivotal mounting connecting one end of each track frame to the chassis so that the track frame may swing about an axis disposed close to and parallel with the cross shaft, a drum mounted on each track frame to rotate about an axis parallel to and disposed away from the cross shaft, an endless track on each track frame, and encircling the sprocket wheel and drum; a transversely extending leaf spring fixed to the chassis and having its opposite ends pivotally connected respectively to the two track frames at locations between the sprocket wheels and drums, two links mounted independently of one another on opposite sides of the chassis and each having its ends pivotally connected respectively to the chassis and track frame so as to swing about axes in a longitudinal direction with respect to the length of the vehicle, each of which pivotal mountings is resiliently yielding so as to permit said track frame to rock about its edge.

4. A motor driven endless track vehicle having an engine and gear casing constituting a part of the chassis, a yoke-piece encircling the bottom of the engine gear casing and having its upper ends provided with outwardly extending projections, a track frame on each side of the chassis, a pivotal mounting connecting one end of the track frame to the chassis, so that the track frame may swing in an up-and-down direction, a transversely extending spring fixed to the bottom of said yoke piece, and having its ends respectively connected to the two track frames at locations spaced away from the pivotal mountings in a longitudinal direction with respect to the length of the vehicle, and two links mounted independently of one another on opposite sides of the chassis, and each having one end pivotally connected to one of the projections of the yoke-piece and at the other end to a track frame, so that the links swing about axes extending in a longitudinal direction with respect to the length of the vehicle, each one of said pivotal mountings being resiliently yielding to permit each track frame to rock about its lower edge.

5. A motor driven endless track vehicle having an engine and gear casing constituting a part of the chassis, a U-shaped yoke-piece for encircling the bottom of the engine and gear casing and having the upper extremities of its limbs bolted to the sides of the engine and gear casing which upper extremities are provided with outwardly extending projections, a track frame on each side of the chassis, a pivotal mounting connecting one end of the track frame to the chassis, so that the track frame may swing in an up-and-down direction, a transversely extending spring fixed to the bottom of said yoke-piece, and having its ends respectively connected to the two track frames at locations spaced away from the pivotal mountings in a longitudinal direction with respect to the length of the vehicle and two links mounted independently of one another on opposite sides of the chassis, and each having one end pivotally connected to one of the projections of the yoke-piece, and at the other end to a track frame, so that the links swing about axes extending in a longitudinal direction with respect to the length of the vehicle, each of which pivotal mountings is resiliently yielding to permit each said track frame to rock about its lower edges.

6. A motor driven endless track vehicle comprising an engine and gear casing forming a chassis, which casing is provided with axle casing projections on each side thereof, a cross shaft mounted in said axle casing so as to project at either end thereof, a driving sprocket fixed on each end, a track frame on each side of the chassis, a pivotal mounting on the axle casing and connecting one end of each track frame to the chassis, so that the track frame may swing in an up-and-down direction, a transversely extending spring fixed to the chassis, and having its two ends pivotally connected to the two track frames at locations disposed away from the pivotal mountings in a longitudinal direction with respect to the length of the vehicle and two links mounted independently of one another on opposite sides of the chassis, and each having its opposite ends pivotally connected respectively to the chassis and to a track frame so as to swing about axes extending in a longitudinal direction with respect to the length of the vehicle, each of which pivotal mountings is resiliently yielding to permit said track frame to rock about its lower ends.

ERNEST THOMAS JAMES TAPP.
JOSEPH DAVEY.

REFERENCES CITED

The following references are of record in the file of this patent:

UNITED STATES PATENTS

| Number | Name | Date |
|---|---|---|
| 2,002,274 | Panzegrau | May 21, 1935 |
| 2,233,627 | McDonald | Mar. 4, 1941 |
| 2,491,283 | Schoenrock | Dec. 13, 1949 |